United States Patent
Yi et al.

(10) Patent No.: US 11,503,497 B2
(45) Date of Patent: *Nov. 15, 2022

(54) METHOD FOR TRIGGERING A BUFFER STATUS REPORTING IN DUAL CONNECTIVITY AND A DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 164 days.

This patent is subject to a terminal disclaimer.

(21) Appl. No.: 17/020,140

(22) Filed: Sep. 14, 2020

(65) Prior Publication Data

US 2020/0413286 A1    Dec. 31, 2020

Related U.S. Application Data

(63) Continuation of application No. 16/440,822, filed on Jun. 13, 2019, now Pat. No. 10,813,003, which is a
(Continued)

(51) Int. Cl.
*H04W 28/02* (2009.01)
*H04W 76/27* (2018.01)
(Continued)

(52) U.S. Cl.
CPC ........ *H04W 28/0278* (2013.01); *H04B 1/707* (2013.01); *H04J 11/00* (2013.01);
(Continued)

(58) Field of Classification Search
CPC . H04W 28/0278; H04W 28/08; H04W 47/30; H04W 76/27
See application file for complete search history.

(56) References Cited

U.S. PATENT DOCUMENTS 8,254,333 B2 * 8/2012 Wu ................ H04L 1/1887
455/436
9,900,902 B2   2/2018 Susitaival et al.
(Continued)

FOREIGN PATENT DOCUMENTS

CN    104507122    4/2015
CN    104519486    4/2015
(Continued)

OTHER PUBLICATIONS

European Patent Office Application Serial No. 16177940.0, Search Report dated Nov. 21, 2016, 10 pages.
(Continued)

*Primary Examiner* — Walli Z Butt
*Assistant Examiner* — Ryan C Kavleski
(74) *Attorney, Agent, or Firm* — Lee Hong Degerman Kang Waimey

(57) ABSTRACT

The present invention relates to a wireless communication system. More specifically, the present invention relates to a method and a device for triggering a buffer status reporting in dual connectivity, the method comprising: configuring a threshold value for a PDCP entity associated with a first MAC entity for a first eNB and a second MAC entity for a second eNB for a radio bearer; checking, by the PDCP entity, whether an amount of uplink data available for transmission in the PDCP entity is less than the threshold value; and indicating, by the PDCP entity, that the amount of uplink data available for transmission in the PDCP entity is '0' to the second MAC entity, if the amount of uplink data available for transmission in the PDCP entity is less than the threshold value.

12 Claims, 10 Drawing Sheets

Related U.S. Application Data continuation of application No. 15/202,473, filed on Jul. 5, 2016, now Pat. No. 10,368,264.

(60) Provisional application No. 62/188,746, filed on Jul. 6, 2015.

(51) Int. Cl.

| | | |
|---|---|---|
| *H04B 1/707* | (2011.01) | |
| *H04J 11/00* | (2006.01) | |
| *H04L 1/18* | (2006.01) | |
| *H04L 41/0681* | (2022.01) | |
| *H04L 43/16* | (2022.01) | |
| *H04W 72/04* | (2009.01) | |
| *H04L 47/30* | (2022.01) | |
| *H04W 28/08* | (2009.01) | |
| *H04W 72/12* | (2009.01) | |
| *H04L 101/622* | (2022.01) | |
| *H04W 88/02* | (2009.01) | |
| *H04W 88/08* | (2009.01) | |
| *H04W 88/16* | (2009.01) | |

(52) U.S. Cl.
CPC ........ *H04L 1/1812* (2013.01); *H04L 41/0681* (2013.01); *H04L 43/16* (2013.01); *H04L 47/30* (2013.01); *H04W 28/08* (2013.01); *H04W 72/0413* (2013.01); *H04W 76/27* (2018.02); *H04L 2101/622* (2022.05); *H04W 72/1284* (2013.01); *H04W 88/02* (2013.01); *H04W 88/08* (2013.01); *H04W 88/16* (2013.01)

(56) References Cited

U.S. PATENT DOCUMENTS

| | | |
|---|---|---|
| 2011/0242972 A1 | 10/2011 | Sebire et al. |
| 2011/0310800 A1 | 12/2011 | Lin et al. |
| 2013/0094482 A1 | 4/2013 | Kim et al. |
| 2016/0150440 A1 | 5/2016 | Lee et al. |
| 2016/0255537 A1 | 9/2016 | Uchino et al. |
| 2016/0337909 A1 | 11/2016 | Cai |
| 2017/0013498 A1 | 1/2017 | Yi et al. |
| 2017/0111927 A1 | 4/2017 | Kim et al. |
| 2017/0295590 A1 | 10/2017 | Loehr et al. |
| 2018/0014255 A1 | 1/2018 | Pelletier et al. |
| 2018/0084450 A1 | 3/2018 | Lee et al. |
| 2018/0103402 A1 | 4/2018 | Susitaival et al. |
| 2018/0199230 A1 | 7/2018 | Lee et al. |
| 2019/0297524 A1 | 9/2019 | Yi et al. |

FOREIGN PATENT DOCUMENTS

| | | |
|---|---|---|
| KR | 10-2014-0121098 | 10/2014 |
| WO | 2014074656 | 5/2014 |
| WO | 2015012545 | 1/2015 |

OTHER PUBLICATIONS

LG Electronics, "Report of the LTE UP ad hoc meeting", R2-152831, 3GPP TSG-RAN WG2 Meeting #90, May 2015, 15 pages.

Taiwan Intellectual Property Office Application Serial No. 105121113, Office Action dated Oct. 13, 2017, 11 pages.

Qualcomm Incorporated, "BSR Considerations For Dual Connectivity," 3GPP TSG-RAN WG2 #85, R2-140408, Feb. 2014, 3 pages.

Panasonic, "BSR Reporting Options for Dual Connectivity," 3GPP TSG-RAN WG2 #85, R2-140475, Feb. 2014, 3 pages.

PCT International Application No. PCT/KR2016/007012, Written Opinion of the International Searching Authority dated Sep. 12, 2016, 10 pages.

U.S. Appl. No. 15/202,473, Notice of Allowance dated Apr. 15, 2019, 10 pages.

U.S. Appl. No. 15/202,473, Final Office Action dated Dec. 4, 2018, 12 pages.

U.S. Appl. No. 15/202,473, Office Action dated May 1, 2018, 23 pages.

U.S. Appl. No. 16/440,822, Office Action dated Aug. 21, 2019, 20 pages.

* cited by examiner (a) Control-Plane Protocol Stack (b) User-Plane Protocol Stack

METHOD FOR TRIGGERING A BUFFER STATUS REPORTING IN DUAL CONNECTIVITY AND A DEVICE THEREFOR

CROSS-REFERENCE TO RELATED APPLICATIONS

This application is a continuation of U.S. patent application Ser. No. 16/440,822, filed on Jun. 13, 2019, which is a continuation of U.S. patent application Ser. No. 15/202,473, filed on Jul. 5, 2016, now U.S. Pat. No. 10,368,264, which claims the benefit of U.S. Provisional Patent Application No. 62/188,746, filed on Jul. 6, 2015, the contents of which are all hereby incorporated by reference herein in their entirety.

BACKGROUND OF THE INVENTION

Field of the Invention

The present invention relates to a wireless communication system and, more particularly, to a method for triggering a buffer status reporting in dual connectivity and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
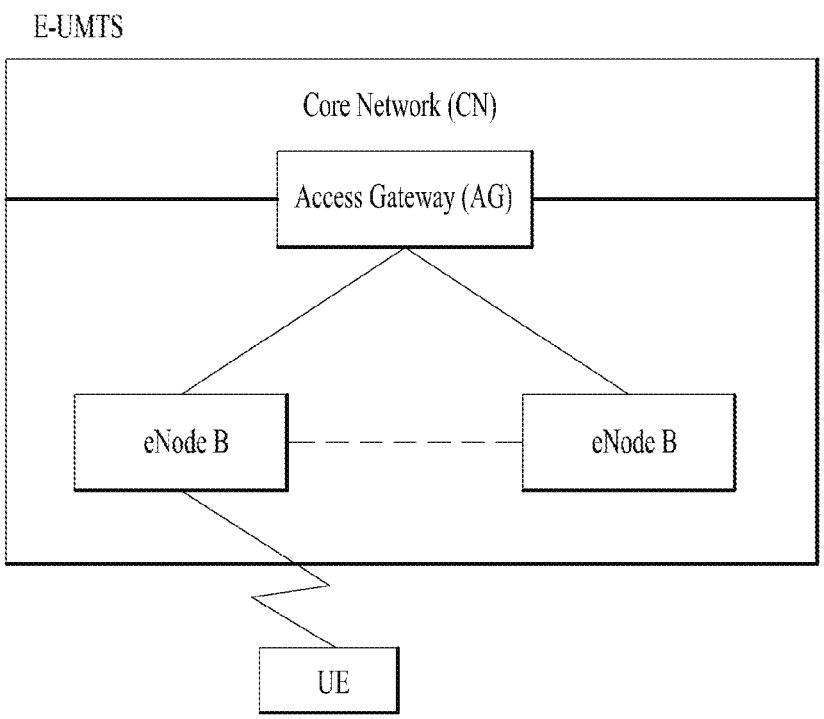
FIG. 1 is a diagram showing a network structure of an Evolved Universal Mobile Telecommunications System (E-UMTS) as an example of a wireless communication system.
Figure 2A:
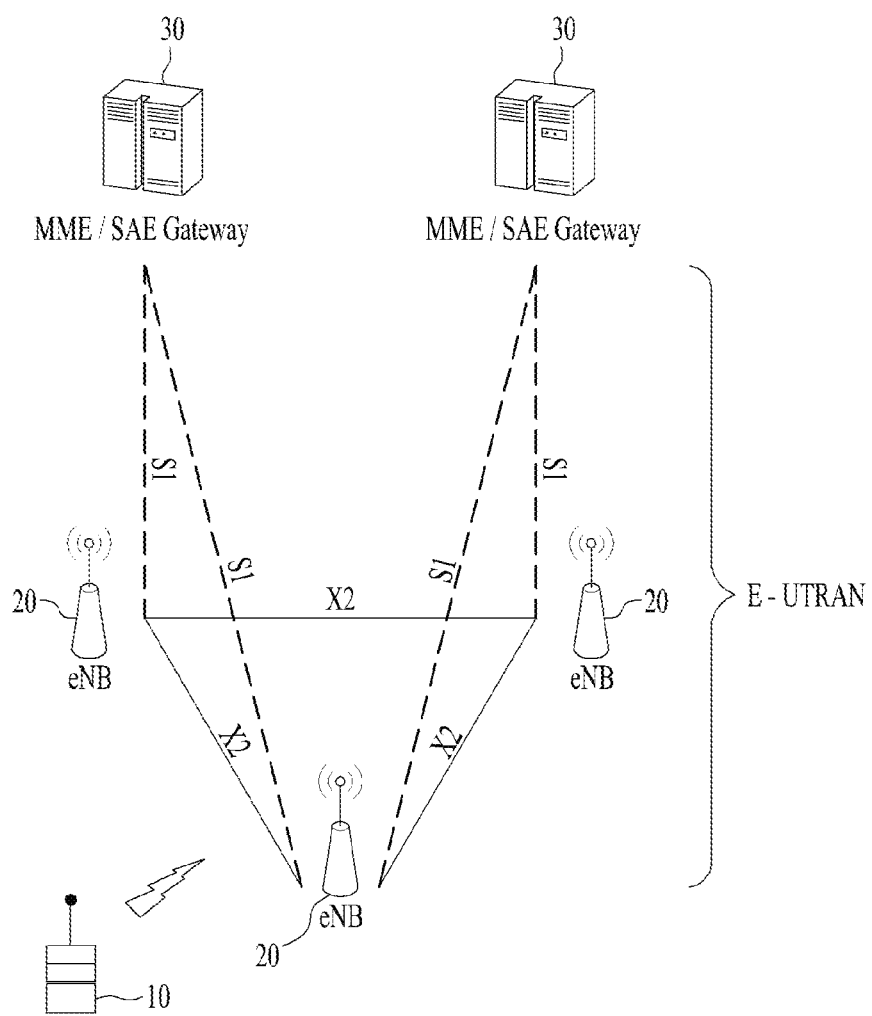
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
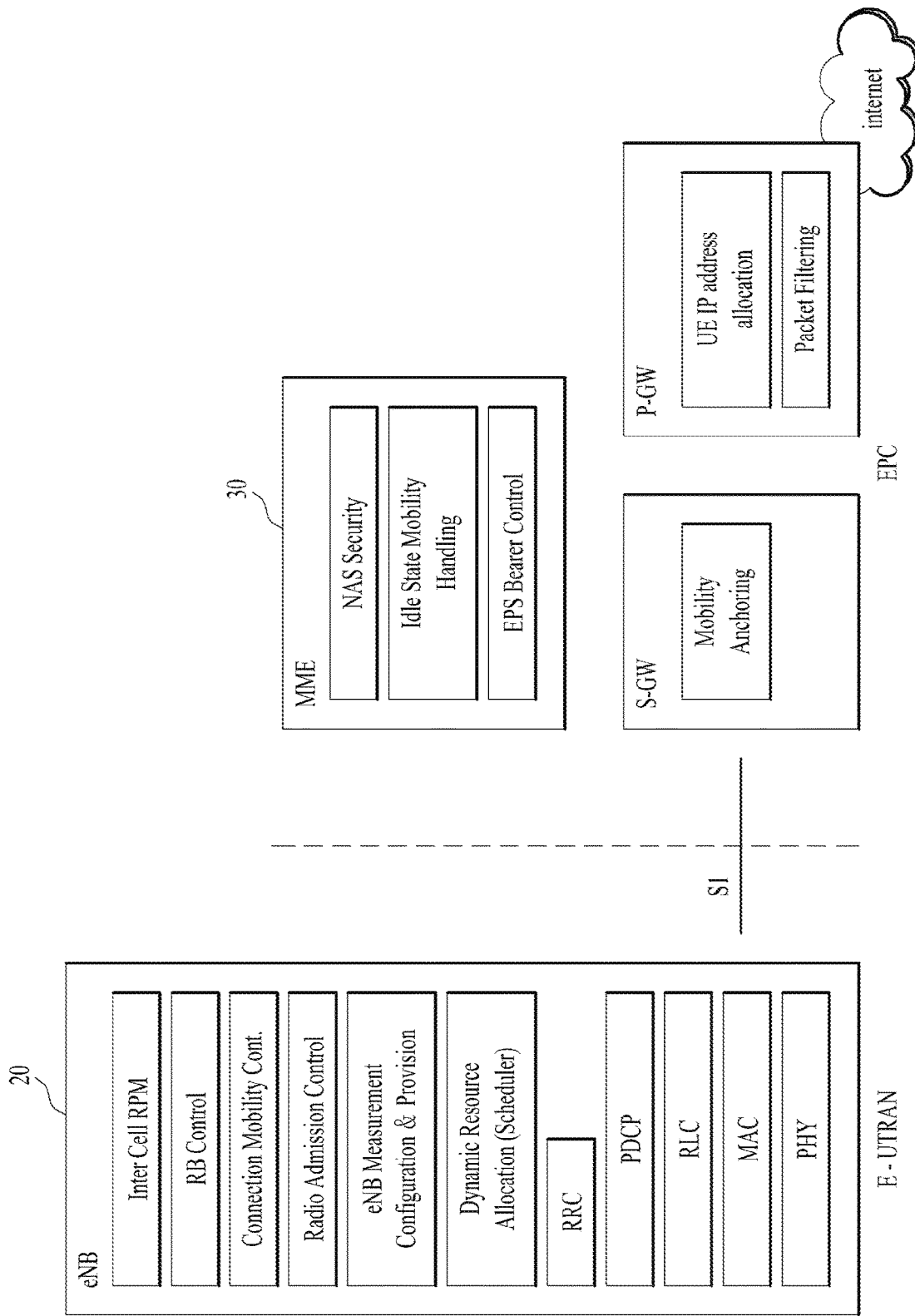
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
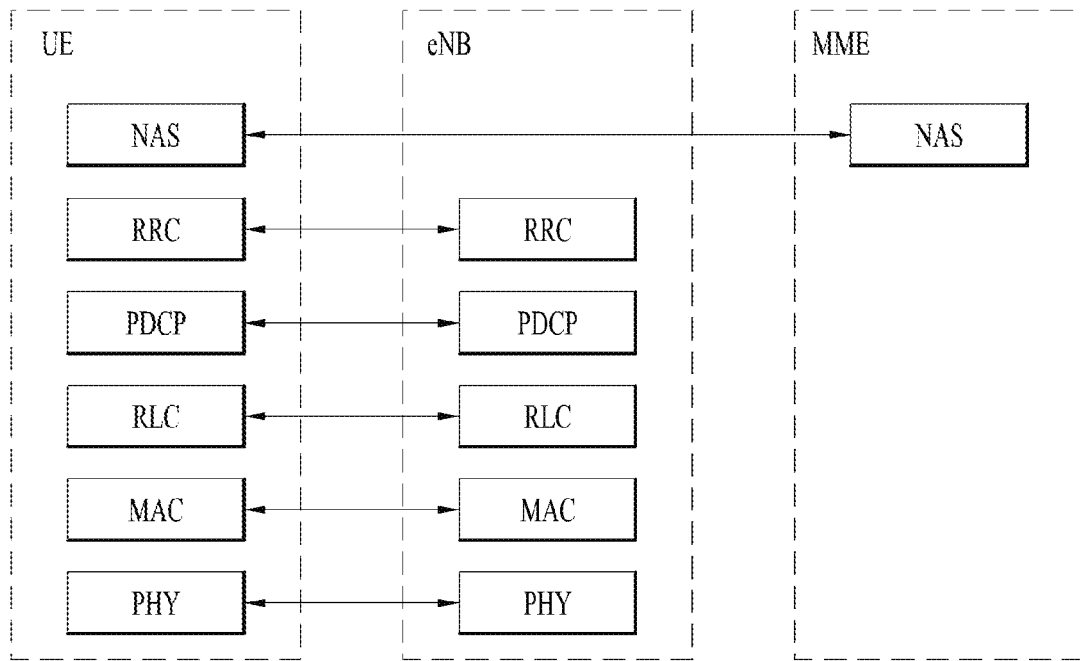
FIG. 3 is a diagram showing a control plane and a user plane of a radio interface protocol between a UE and an E-UTRAN based on a 3rd generation partnership project (3GPP) radio access network standard.
Figure 3:
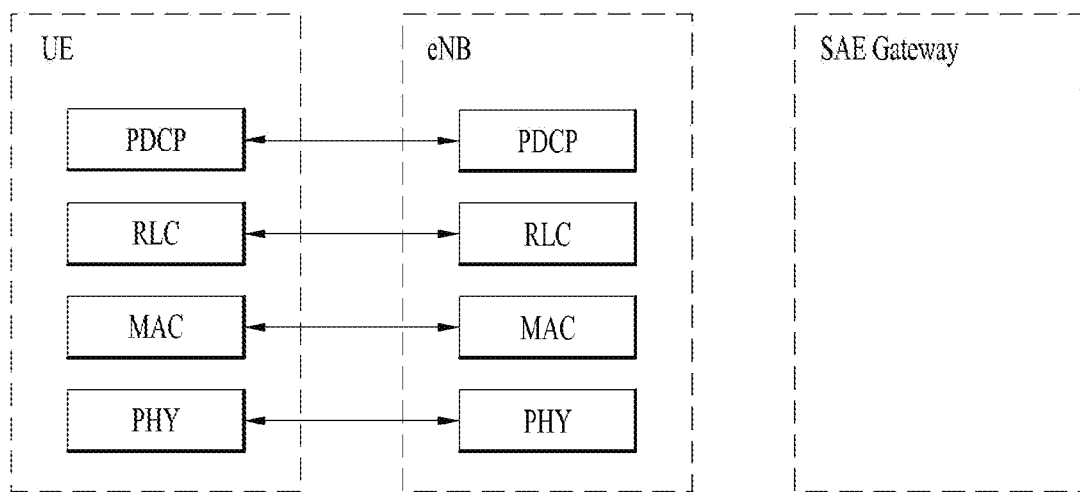

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
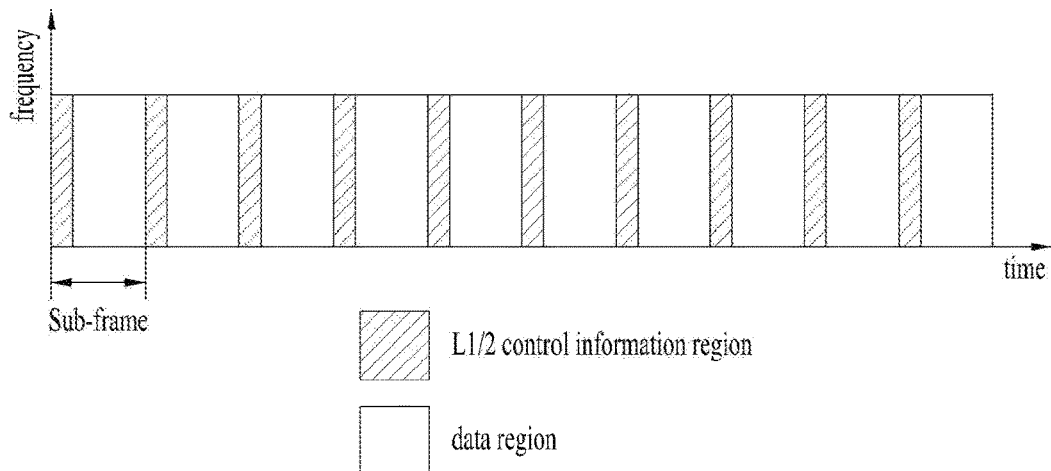
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
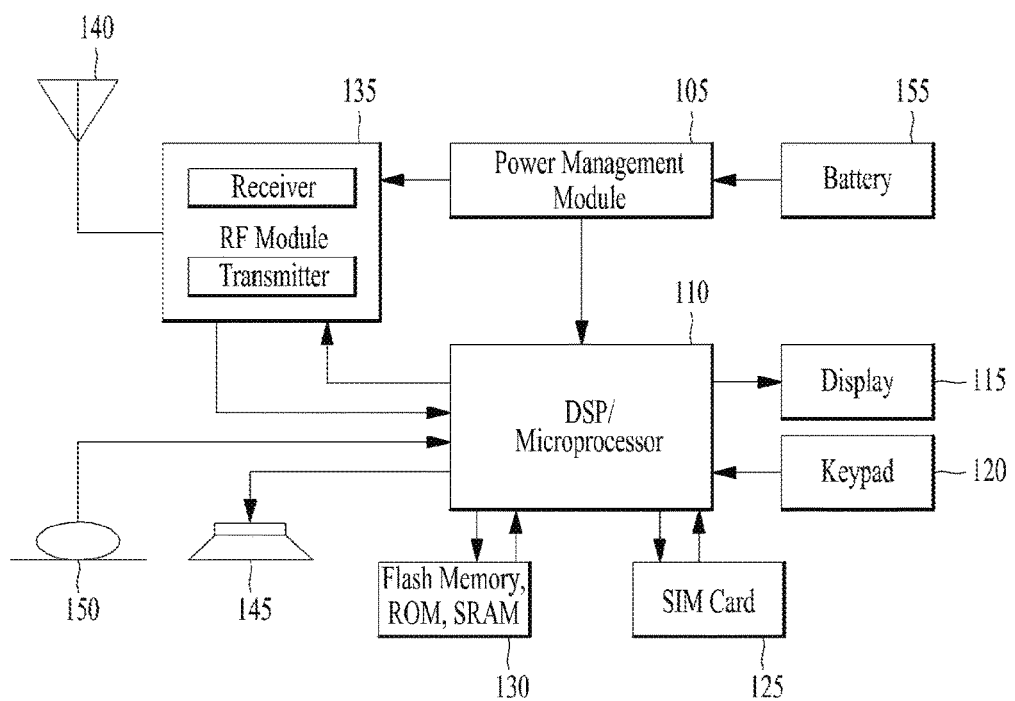
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 6:
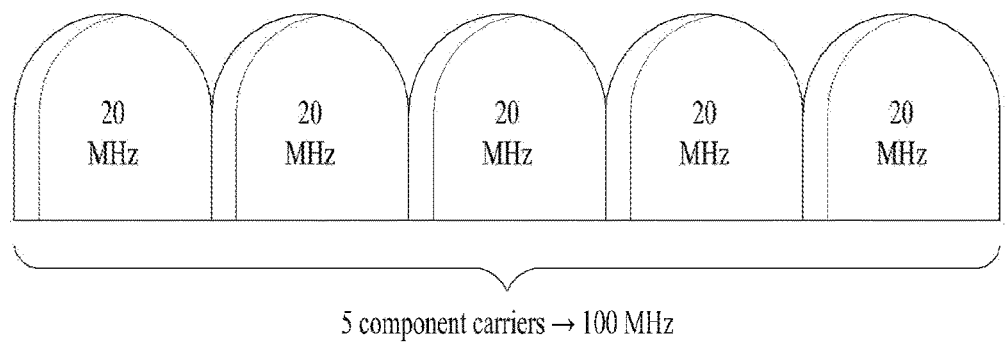
FIG. 6 is a diagram for carrier aggregation.

FIG. 6 is a diagram for carrier aggregation.

Carrier Aggregation (CA) technology for supporting multiple carriers is described with reference to FIG. 6 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to a SCell is a Downlink Secondary Component Carrier (DL SCC) while in the uplink it is an Uplink Secondary Component Carrier (UL SCC).

The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The configured set of serving cells for a UE therefore always consists of one PCell and one or more SCells: i) for each SCell the usage of uplink resources by the UE in addition to the downlink ones is configurable (the number of DL SCCs configured is therefore always larger than or equal to the number of UL SCCs and no SCell can be configured for usage of uplink resources only); ii) from a UE viewpoint, each uplink resource only belongs to one serving cell; iii) the number of serving cells that can be configured depends on the aggregation capability of the UE; iv) PCell can only be changed with handover procedure (i.e. with security key change and RACH procedure); v) PCell is used for transmission of PUCCH; vi) Unlike SCells, PCell cannot be de-activated; vii) Re-establishment is triggered when PCell experiences RLF, not when SCells experience RLF; and viii) NAS information is taken from PCell.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

The reconfiguration, addition and removal of SCells can be performed by RRC. At intra-LTE handover, RRC can also add, remove, or reconfigure SCells for usage with the target PCell. When adding a new SCell, dedicated RRC signaling is used for sending all required system information of the SCell i.e. while in connected mode, UEs need not acquire broadcasted system information directly from the SCells.

Figure 7:
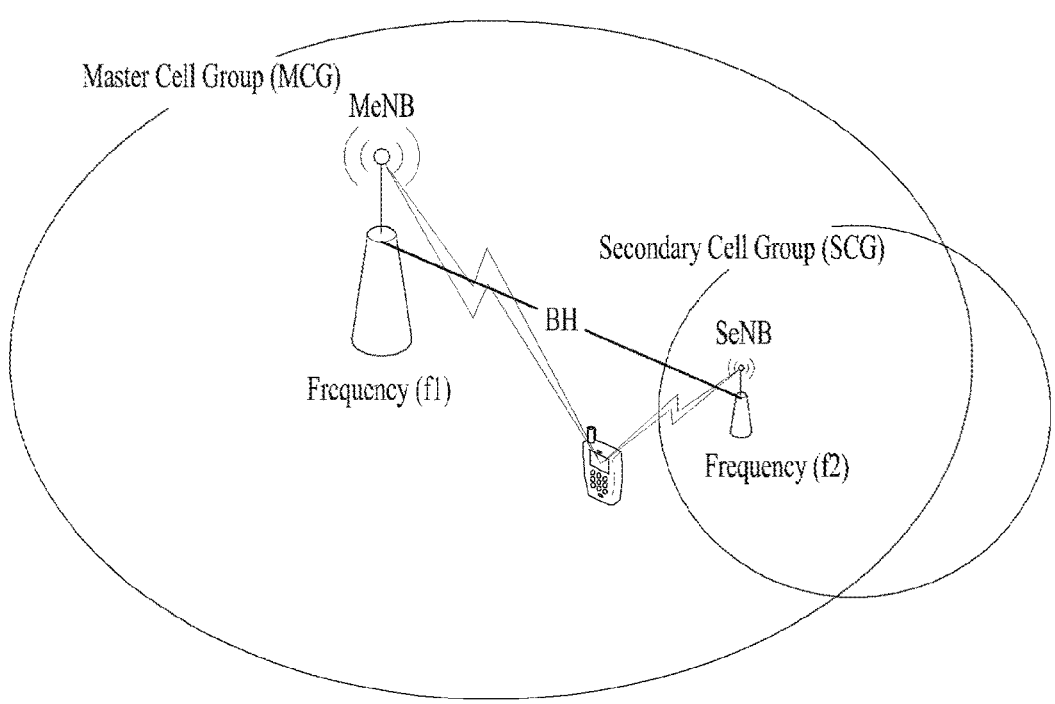
FIG. 7 is a conceptual diagram for Dual Connectivity (DC) between a Master Cell Group (MCS) and a Secondary Cell Group (SCG)

FIG. 7 is a conceptual diagram for Dual Connectivity (DC) between a Master Cell Group (MCS) and a Secondary Cell Group (SCG).

The Dual Connectivity (DC) means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

The Dual Connectivity is a kind of carrier aggregation in that the UE is configured a plurality serving cells. However, unlike all serving cells supporting carrier aggregation of FIG. 6 are served by a same eNB, all serving cells supporting dual connectivity of FIG. 7 are served by different eNBs, respectively at same time. The different eNBs are connected via non-ideal backhaul interface because the UE is connected with the different eNBs at same time.

With Dual Connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

For SCG, the following principles are applied: i) at least one cell in SCG has a configured UL CC and one of them, named PSCell, is configured with PUCCH resources; ii) RRC connection Re-establishment procedure is not triggered; iii) for split bearer, the DL data transfer over the MeNB is maintained; iv) PSCell cannot be de-activated; and v) PSCell can only be changed with SCG change (i.e. with security key change and RACH procedure).

With respect to the interaction between MeNB and SeNB, the following principles are applied: i) the MeNB maintains the RRM measurement configuration of the UE and may, e.g, based on received measurement reports or traffic conditions or bearer types, decide to ask a SeNB to provide additional resources (serving cells) for a UE; ii) upon receiving the request from the MeNB, a SeNB may create the container that will result in the configuration of additional serving cells for the UE (or decide that it has no resource available to do so); iii) for UE capability coordination, the MeNB provides (part of) the AS configuration and the UE capabilities to the SeNB; iv) the MeNB and the SeNB exchange information about UE configuration by means of RRC containers (inter-node messages) carried in X2 messages; v) the SeNB may initiate a reconfiguration of its existing serving cells (e.g., PUCCH towards the SeNB); vi) the SeNB decides which cell is the PSCell within the SCG; and vii) the MeNB does not change the content of the RRC configuration provided by the SeNB.

Figure 8:
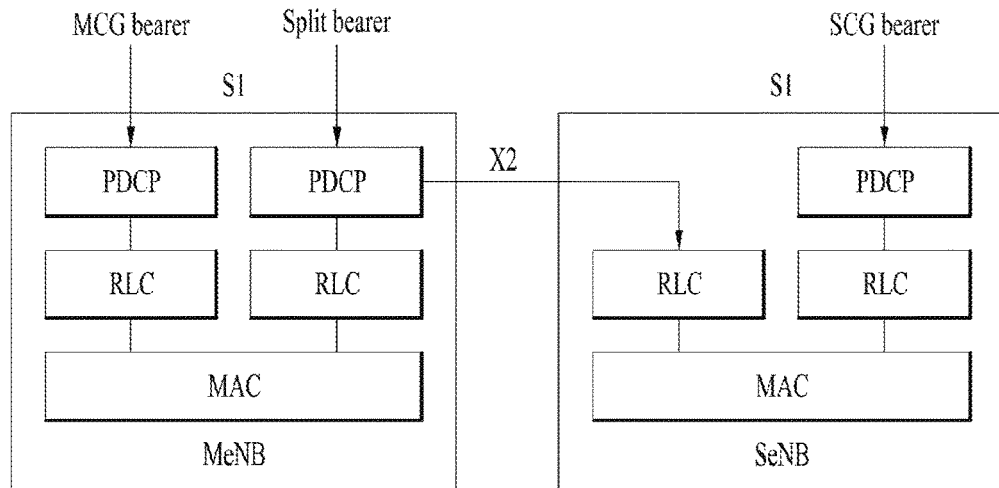
FIG. 8 is a conceptual diagram for radio protocol architecture for a split bearer.

FIG. 8 is a conceptual diagram for radio protocol architecture for a split bearer.

In the dual connectivity operation, the radio protocol architecture that a particular bearer uses depends on how the bearer is setup. Three alternatives exist, MCG bearer, split bearer and SCG bearer. Those three alternatives are depicted on FIG. 8. The SRBs (Signaling Radio Bearers) are always of the MCG bearer and therefore only use the radio resources provided by the MeNB. The MCG bearer is a radio protocol only located in the MeNB to use MeNB resources only in the dual connectivity. And the SCG bearer is a radio protocol only located in the SeNB to use SeNB resources in the dual connectivity.

Specially, the split bearer is a radio protocol located in both the MeNB and the SeNB to use both MeNB and SeNB resources in the dual connectivity and the split bearer may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

The functions of the different MAC entities in the UE operate independently in principle. The timers and parameters used in each MAC entity are configured independently in principle. The Serving Cells, C-RNTI, radio bearers, logical channels, upper and lower layer entities, LCGs, and HARQ entities considered by each MAC entity refer to those mapped to that MAC entity if not otherwise indicated. Exceptively, if otherwise indicated, the different MAC entities can be performed dependently.

The expected benefits of the split bearer are: i) the SeNB mobility hidden to CN, ii) no security impacts with ciphering being required in MeNB only, iii) no data forwarding between SeNBs required at SeNB change, iv) offloads RLC processing of SeNB traffic from MeNB to SeNB, v) little or no impacts to RLC, vi) utilization of radio resources across MeNB and SeNB for the same bearer possible, vii) relaxed requirements for SeNB mobility (MeNB can be used in the meantime).

Figure 9:
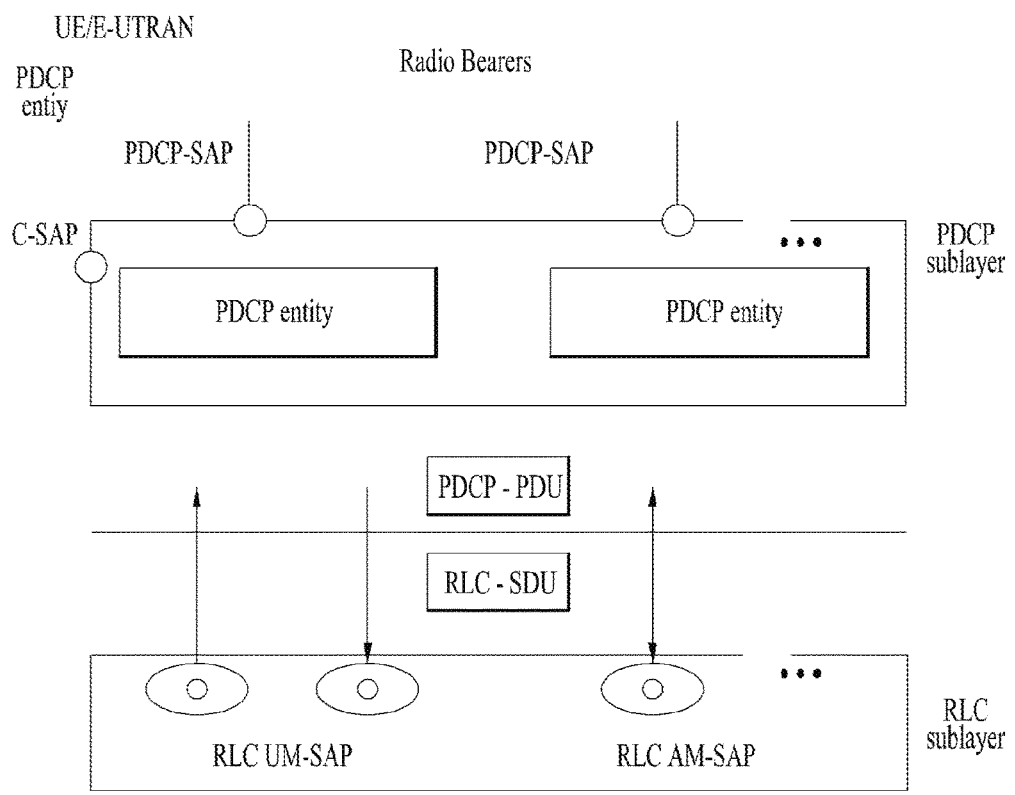
FIG. 9 is a conceptual diagram for a PDCP entity architecture.

Meanwhile, in LTE-WLAN radio level integration, the radio protocol architecture that a particular bearer uses depends on the LWA backhaul scenario and how the bearer is set up. For the LTE-WLAN radio level integration, similar architecture as dual connectivity can be used. The only change is to replace SeNB by WLAN. Thus, all functions depending on the split bearer can be applied on all technical areas to be used the split bearer. For example, if a structure of the split bearer is applied in a new RAT to be used in 5G network, the all functions depending on the split bearer can be applied on the new RAT. FIG. 9 is a conceptual diagram for a PDCP entity architecture.

FIG. 9 represents one possible structure for the PDCP sublayer, but it should not restrict implementation. Each RB (i.e. DRB and SRB, except for SRB0) is associated with one PDCP entity. Each PDCP entity is associated with one or two (one for each direction) RLC entities depending on the RB characteristic (i.e. unidirectional or bi-directional) and RLC mode. The PDCP entities are located in the PDCP sublayer. The PDCP sublayer is configured by upper layers.

Figure 10:
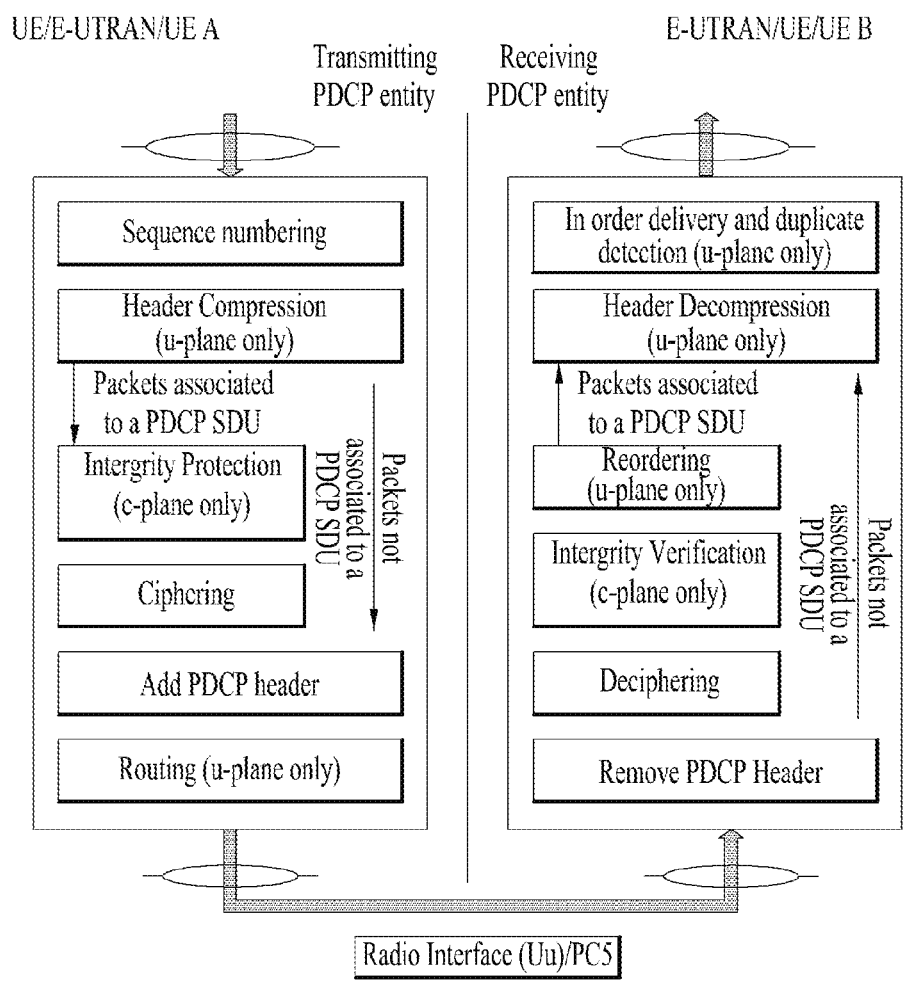
FIG. 10 is a conceptual diagram for functional view of a PDCP entity.

FIG. 10 is a conceptual diagram for functional view of a PDCP entity.

The PDCP entities are located in the PDCP sublayer. Several PDCP entities may be defined for a UE. Each PDCP entity carrying user plane data may be configured to use header compression. Each PDCP entity is carrying the data of one radio bearer. In this version of the specification, only the robust header compression protocol (ROHC), is supported. Every PDCP entity uses at most one ROHC compressor instance and at most one ROHC decompressor instance. A PDCP entity is associated either to the control plane or the user plane depending on which radio bearer it is carrying data for.

FIG. 10 represents the functional view of the PDCP entity for the PDCP sublayer, it should not restrict implementation. The figure is based on the radio interface protocol architecture.

For split bearers, routing is performed in the transmitting PDCP entity, and reordering is performed in the receiving PDCP entity.

When submitting PDCP PDUs to lower layers, the transmitting PDCP entity shall submit the PDCP PDUs to the associated AM RLC entity configured for SCG if ul-DataSplitDRB-ViaSCG is set to TRUE by upper layers. And if else, the transmitting PDCP entity shall submit the PDCP PDUs to the associated AM RLC entity configured for MCG.

Here, the ul-DataSplitDRB-ViaSCG indicates that whether the UE shall send PDCP PDUs via SCG. E-UTRAN only configures the field (i.e. indicates value TRUE) for split DRBs.

Data Available for Transmission in PDCP Entity

For the purpose of MAC buffer status reporting, the UE may consider PDCP Control PDUs, as well as the following as data available for transmission in the PDCP layer, for SDUs for which no PDU has been submitted to lower layers: i) the SDU itself, if the SDU has not yet been processed by PDCP, or ii) the PDU if the SDU has been processed by PDCP.

In addition, for radio bearers that are mapped on RLC AM, if the PDCP entity has previously performed the re-establishment procedure, the UE may also consider the following as data available for transmission in the PDCP layer, for SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received: i) the SDU, if it has not yet been processed by PDCP, or ii) the PDU once it has been processed by PDCP.

For split bearers, when indicating the data available for transmission to the MAC entity for BSR triggering and Buffer Size calculation, the UE shall indicate the data available for transmission to the MAC entity configured for SCG only if ul-DataSplitDRB-ViaSCG is set to TRUE by the upper layer. And if else, the UE shall indicate the data available for transmission to the MAC entity configured for MCG only.

Figure 11:
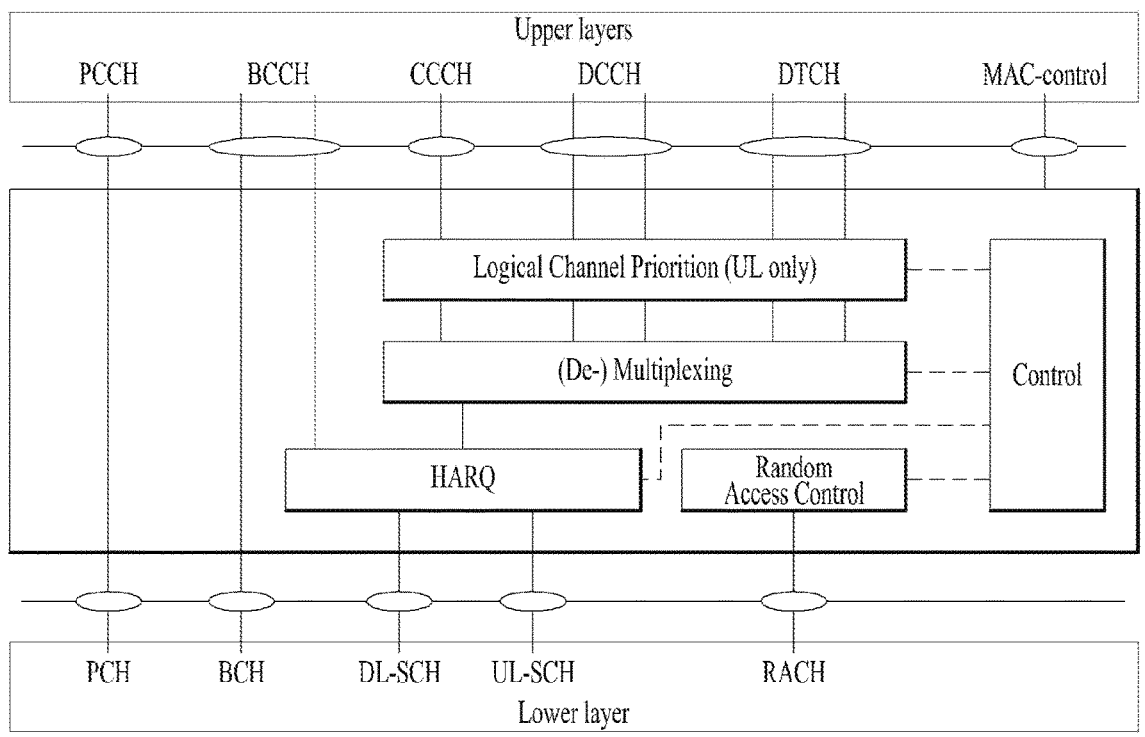
FIG. 11 is a diagram for MAC structure overview in a UE side.

FIG. 11 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data. The set of logical-channel types specified for LTE includes:

- The Broadcast Control Channel (BCCH), used for transmission of system information from the network to all terminals in a cell. Prior to accessing the system, a terminal needs to acquire the system information to find out how the system is configured and, in general, how to behave properly within a cell.
- The Paging Control Channel (PCCH), used for paging of terminals whose location on a cell level is not known to the network. The paging message therefore needs to be transmitted in multiple cells.
- The Common Control Channel (CCCH), used for transmission of control information in conjunction with random access.
- The Dedicated Control Channel (DCCH), used for transmission of control information to/from a terminal. This channel is used for individual configuration of terminals such as different handover messages.
- The Multicast Control Channel (MCCH), used for transmission of control information required for reception of the MTCH.
- The Dedicated Traffic Channel (DTCH), used for transmission of user data to/from a terminal. This is the logical channel type used for transmission of all uplink and non-MBSFN downlink user data.
- The Multicast Traffic Channel (MTCH), used for downlink transmission of MBMS services.

To support priority handling, multiple logical channels, where each logical channel has its own RLC entity, can be multiplexed into one transport channel by the MAC layer. At the receiver, the MAC layer handles the corresponding demultiplexing and forwards the RLC PDUs to their respective RLC entity for in-sequence delivery and the other functions handled by the RLC. To support the demultiplexing at the receiver, a MAC is used. To each RLC PDU, there is an associated sub-header in the MAC header. The sub-header contains the identity of the logical channel (LCID) from which the RLC PDU originated and the length of the PDU in bytes. There is also a flag indicating whether this is the last sub-header or not. One or several RLC PDUs, together with the MAC header and, if necessary, padding to meet the scheduled transport-block size, form one transport block which is forwarded to the physical layer.

In addition to multiplexing of different logical channels, the MAC layer can also insert the so-called MAC control elements into the transport blocks to be transmitted over the transport channels. A MAC control element is used for inband control signaling—for example, timing-advance commands and random-access response. Control elements are identified with reserved values in the LCID field, where the LCID value indicates the type of control information. Furthermore, the length field in the sub-header is removed for control elements with a fixed length.

The MAC multiplexing functionality is also responsible for handling of multiple component carriers in the case of carrier aggregation. The basic principle for carrier aggregation is independent processing of the component carriers in the physical layer, including control signaling, scheduling and hybrid-ARQ retransmissions, while carrier aggregation is invisible to RLC and PDCP. Carrier aggregation is therefore mainly seen in the MAC layer, where logical channels, including any MAC control elements, are multiplexed to form one (two in the case of spatial multiplexing) transport block(s) per component carrier with each component carrier having its own hybrid-ARQ entity.

In Dual Connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively. A Timing Advance Group containing the SpCell of a MAC entity is referred to as pTAG, whereas the term sTAG refers to other TAGs.

As mentioned above, the functions of the different MAC entities in the UE operate independently in principle. The timers and parameters used in each MAC entity are configured independently in principle. The Serving Cells, C-RNTI, radio bearers, logical channels, upper and lower layer entities, LCGs, and HARQ entities considered by each MAC entity refer to those mapped to that MAC entity if not otherwise indicated. Exceptively, if otherwise indicated, the different MAC entities can be performed dependently.

Meanwhile, UEs that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report.

From a scheduling perspective, buffer information for each logical channel is beneficial, although this could result in a significant overhead. Logical channels are therefore grouped into logical-channel groups and the reporting is done per group. The buffer-size field in a buffer-status report indicates the amount of data available transmission across all logical channels in a logical-channel group.

The Buffer Status Reporting (BSR) procedure is used to provide a serving eNB with information about the amount of data available for transmission (DAT) in the UL buffers of the UE. RRC may control BSR reporting by configuring the three timers periodicBSR-Timer and retxBSR-Timer and logicalChannelSR-ProhibitTimer and by, for each logical channel, optionally signaling Logical Channel Group (LCG) which allocates the logical channel to an LCG.

A buffer status report represents one or all four logical-channel groups and can be triggered for the following reasons:

i) Arrival of data with higher priority than currently in the transmission buffer—that is, data in a logical-channel group with higher priority than the one currently being transmitted—as this may impact the scheduling decision. The UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR".

ii) Change of serving cell, in which case a buffer-status report is useful to provide the new serving cell with information about the situation in the terminal.

iii) Periodically as controlled by a timer. A retxBSR-Timer expires and the UE has data available for transmission for any of the logical channels which belong to a LCG, in which case the BSR is referred below to as "Regular BSR", or a periodicBSR-Timer expires, in which case the BSR is referred below to as "Periodic BSR".

iv) UL resources are allocated and number of padding bits is equal to or larger than the size of the Buffer Status Report MAC control element plus its subheader, in which case the BSR is referred below to as "Padding BSR". If the amount of padding required to match the scheduled transport block size is larger than a buffer-status report, a buffer-status report is inserted. Clearly it is better to exploit the available payload for useful scheduling information instead of padding if possible.

For Regular BSR, if the BSR is triggered due to data becoming available for transmission for a logical channel for which logicalChannelSR-ProhibitTimer is configured by upper layers, the MAC entity starts the logicalChannelSR-ProhibitTimer if not running. If running, the MAC entity stops the logicalChannelSR-ProhibitTimer.

For Regular and Periodic BSR, if more than one LCG has data available for transmission in the TTI where the BSR is transmitted, the UE may report Long BSR. If else, the UE may report Short BSR.

If the Buffer Status reporting procedure determines that at least one BSR has been triggered and not cancelled, if the UE has UL resources allocated for new transmission for this TTI, the UE may instruct the Multiplexing and Assembly procedure to generate the BSR MAC control element(s), start or restart periodicBSR-Timer except when all the generated BSRs are Truncated BSRs, and start or restart retxBSR-Timer.

A MAC PDU may contain at most one MAC BSR control element, even when multiple events trigger a BSR by the time a BSR can be transmitted in which case the Regular BSR and the Periodic BSR shall have precedence over the padding BSR.

The UE may restart retxBSR-Timer upon indication of a grant for transmission of new data on any UL-SCH.

All triggered BSRs may be cancelled in case UL grants in this subframe can accommodate all pending data available for transmission but is not sufficient to additionally accommodate the BSR MAC control element plus its subheader. All triggered BSRs shall be cancelled when a BSR is included in a MAC PDU for transmission.

The UE shall transmit at most one Regular/Periodic BSR in a TTI. If the UE is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

The PDCP entity indicates data available for transmission in PDCP (DATP) to the MAC entity when there is change in DATP (or every TTI). Based on the change in DATP, the MAC entity may trigger BSR if triggering condition is met, e.g. if DATP is changed from 0 to finite value.

For UL split bearers in Rel-12 of 3GPP, the UE indicates the DATP to only one MAC entity depending on the configuration (ul-DataSplitDRB-ViaSCG). For the other MAC entity, the UE does not indicate DATP at all.

In Rel-13 of 3GPP, indication behavior of the PDCP entity is changed due to the introduction of threshold, as shown below.

If the PDCP data amount is the threshold, both MAC entities triggers BSRs and if the PDCP data amount is less than threshold, only one MAC entity triggers BSR. If ul-DataSplitDRB-ViaSCG is set to TRUE by upper layer, the PDCP entity indicates DATP to the MAC entity configured for SCG only. And else, the PDCP entity indicates DATP to the MAC entity configured for MCG only.

The threshold is configured per radio bearer. Thus, the threshold applies to UL data becoming available in PDCP only.

The PDCP entity is indicated by ul-DataSplitDRB-ViaSCG-r12 to which the eNB UE shall trigger BSR when PDCP data amount is less than the threshold. The PDCP entity reports a buffer status for UL bearer split only towards the eNB indicated by ul-DataSplitDRB-ViaSCG-r12 when PDCP data amount is less than the threshold. In this case, the PDCP entity reports the buffer status for UL bearer split towards the both eNBs when PDCP data amount is above the threshold. The PDCP entity transmits a PDCP PDU for UL bearer split only towards the eNB indicated by ul-DataSplitDRB-ViaSCG-r12 when PDCP data amount is less than the threshold. BSR triggering, Buffer Size calculation, and data transmission can be aligned.

There are 6 cases to be considered regarding the introduction of the threshold.

Case 1 is a case of an arriving PDCP SDU when there is empty buffer, and an amount of the PDCP SDU (X) is less than the threshold. According to above conclusion, a S-MAC triggers BSR (because, ul-DataSplitDRB-ViaSCG-r12 indicates the S-MAC), a PDCP indicates X to the S-MAC, 'X' is reported for buffer status calculation in S-MAC, and '0' is reported for buffer status calculation in M-MAC.

Case 2 is a case of an arriving PDCP SDU when there is empty buffer, and an amount of the PDCP SDU (X) is larger than the threshold. M-MAC and S-MAC triggers a BSR, respectively, PDCP indicates 'X' to both M-MAC and S-MAC. And 'X' is reported for buffer status calculation in S-MAC, and 'X' is reported for buffer status calculation in M-MAC.

Case 3 is a case of an arriving PDCP SDU (X) when an amount of data in PDCP buffer (Y) was less than a threshold, and an amount of data in the PDCP buffer (X+Y) is less than the threshold yet. In this case the UE doesn't trigger a BSR.

Case 4 is a case of an arriving PDCP SDU (X) when an amount of data in PDCP buffer (Y) is less than the threshold, and an amount of data in the PDCP buffer (X+Y) becomes larger than the threshold. In this case the PDCP entity indicates X+Y to M-MAC.

Case 5 is a case of an arriving PDCP SDU (X) when an amount of data in PDCP buffer (Y) is larger than the threshold, and an amount of data in the PDCP buffer (X+Y) is larger than the threshold also. And case 6 is that an amount of data in PDCP entity changes from a value less than the threshold to a value of larger than the threshold. In the both of case 5 and case 6, the UE doesn't trigger a BSR.

Figure 12:
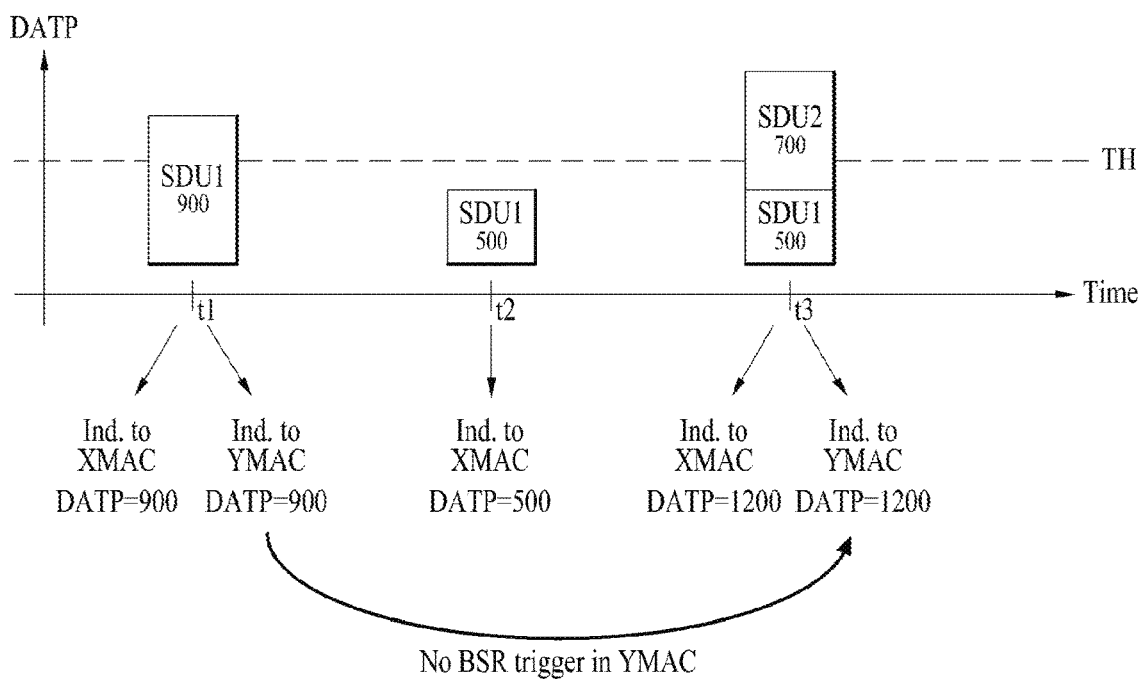
FIG. 12 is an example of problematic situation for PDCP data indication to MAC entity in UL split bearer.

FIG. 12 is an example of problematic situation for PDCP data indication to MAC entity in UL split bearer.

Regarding FIG. 12, let assume that the threshold (TH) is set to 700 bytes. The problem is that when the DATP is less than TH, the PDCP entity indicates the DATP only to the MAC entity to which the ul-DataSplitDRB-ViaSCG is configured (let's call it X-MAC), and the PDCP entity does not indicate the DATP to the MAC entity to which the ul-DataSplitDRB-ViaSCG is not configured (let's call it Y-MAC).

At t=t1, the PDCP entity receives SDU1 with 900 bytes from the upper layer. The PDCP entity indicates 900 bytes to both X-MAC and Y-MAC entities, and both X-MAC and Y-MAC triggers BSRs because the buffer size changes from 0 to 900.

At t=t2, the XeNB and/or YeNB provides UL grants, and the UE transmits the part of PDCP SDU1 to the XeNB and/or YeNB. The DATP becomes 500, and the PDCP entity indicates 500 to only the X-MAC entity because the DATP is less than TH.

At t=t3, the PDCP entity receives SDU2 with 700 bytes from the upper layer. The PDCP entity indicates DATP=1200 bytes to both X-MAC and Y-MAC entities. In this case, the YMAC entity does not trigger a BSR because the YMAC entity considers that the buffer size is changed from 900 to 1200.

Then, from the Y-MAC perspective, the Y-MAC is not indicated of DATP when the DATP becomes zero, and the YMAC would not trigger a BSR when the DATP becomes above TH.

Figure 13:
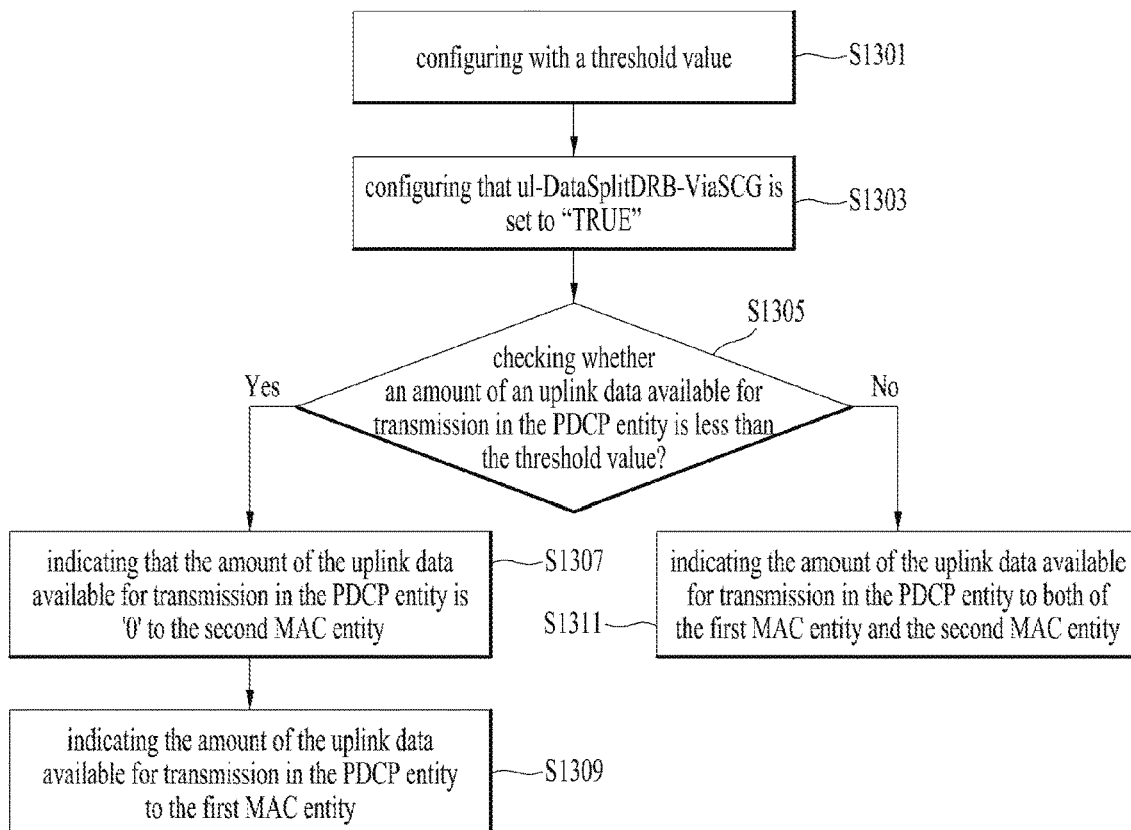
FIG. 13 is a conceptual diagram for triggering a buffer status reporting in dual connectivity according to embodiments of the present invention.

FIG. 13 is a conceptual diagram for triggering a buffer status reporting in dual connectivity according to embodiments of the present invention.

To resolve above-mentioned problem, it is invented that, for UL split bearer in Dual Connectivity, when the amount of data available for transmission in PDCP (DATP) is lower than (or equal to) the threshold (TH), the PDCP entity indicates the amount of DATP as ZERO to the MAC entity which is configured not to transmit the PDCP PDU when the amount of DATP is lower than (or equal to) TH (hereafter called second MAC or Y-MAC), and the PDCP entity indicates the amount of DATP as it is to the MAC entity which is configured to transmit the PDCP PDU when the amount of DATP is lower than (or equal to) TH (hereafter called first MAC or X-MAC).

The PDCP entity is associated with a first RLC entity and a first MAC entity for a first eNB and a second RLC entity and a second MAC entity for a second eNB for a radio bearer.

Preferably, the radio bearer is a split bearer for a Dual Connectivity.

When the PDCP entity is configured with a threshold value (S1301), the PDCP entity may provide indication to the YMAC entity only when the amount of DATP is changed across TH, i.e. from DATP>=TH to DATP<TH, or from DATP<TH to DATP>=TH.

Further, the PDCP entity can be configured to indicate that an uplink data in PDCP entity should be transmitted to the first RLC entity (or first eNB) if the amount of uplink data available for transmission in the PDCP entity is less than the threshold value (S1303).

For example, if ul-DataSplitDRB-ViaSCG is set to TRUE by the upper layer, the PDCP entity can indicate the data available for transmission to the MAC entity configured for SCG only if the amount of uplink data available for transmission in the PDCP entity is less than the threshold value.

Preferably, the first RLC entity and the first MAC entity are for a SeNB.

When an uplink data becomes available for transmission in the PDCP entity, the PDCP entity can check whether an amount of an uplink data available for transmission in the PDCP entity is less than the threshold value (S1305).

If the amount of uplink data available for transmission in the PDCP entity is less than the threshold value, the PDCP entity indicates that the amount of the uplink data available for transmission in the PDCP entity is '0' to the second MAC entity (or Y-MAC) (S1307). And the PDCP entity indicates that the amount of the uplink data available for transmission in the PDCP entity to the first MAC entity (or X-MAC) (S1309).

Preferably, the second RLC entity and the second MAC entity are for a MeNB.

If the amount of uplink data available for transmission in the PDCP entity is larger than the threshold value, the PDCP entity indicates that the amount of the uplink data available for transmission in the PDCP entity to the first MAC entity and the second MAC entity (S1311).

When the Y-MAC receives indication from the PDCP entity with DATP>zero, the Y-MAC triggers a BSR if the last indication of DATP from the PDCP entity was zero. If the last indication of DATP from the PDCP entity was not zero (i.e. larger than zero), the Y-MAC entity does not trigger a BSR. When the YMAC receives indication from the PDCP entity that DATP=zero, the YMAC does not trigger a BSR.

In the step of S1307, a second MAC entity receives from an upper entity a first indication indicating that a first amount of uplink data available for transmission in the upper entity is '0', if the first amount of uplink data available for transmission in the upper entity is less than a threshold value. The first indication indicates that an amount of uplink data available for transmission in the upper entity which is less than a threshold value is '0'. When the second MAC entity receives a second indication indicating a second amount of uplink data available for transmission in the upper entity, if the second amount of uplink data available for transmission in the upper entity is larger than or equal to the threshold value, the second MAC entity can trigger a BSR.

The second indication indicates that an amount of uplink data available for transmission in the upper entity which is larger than the threshold value.

Preferably, if the second MAC entity receives from an upper entity a first indication indicating that an amount of uplink data available for transmission in the upper entity which is less than a threshold value is '0', the amount of the uplink data available for transmission in the upper entity which is less than a threshold value is not zero. Thus, the first MAC entity may receive an indication indicating that the amount of uplink data available for transmission in the upper entity when the first indication is transmitted, the first MAC entity triggered the BSR already when the indication is received.

Preferably, the threshold (TH) is configured by the eNB using RRC message when the UL split bearer is configured.

Preferably, the upper entity can be a PDCP entity or a RLC entity.

Figure 14:
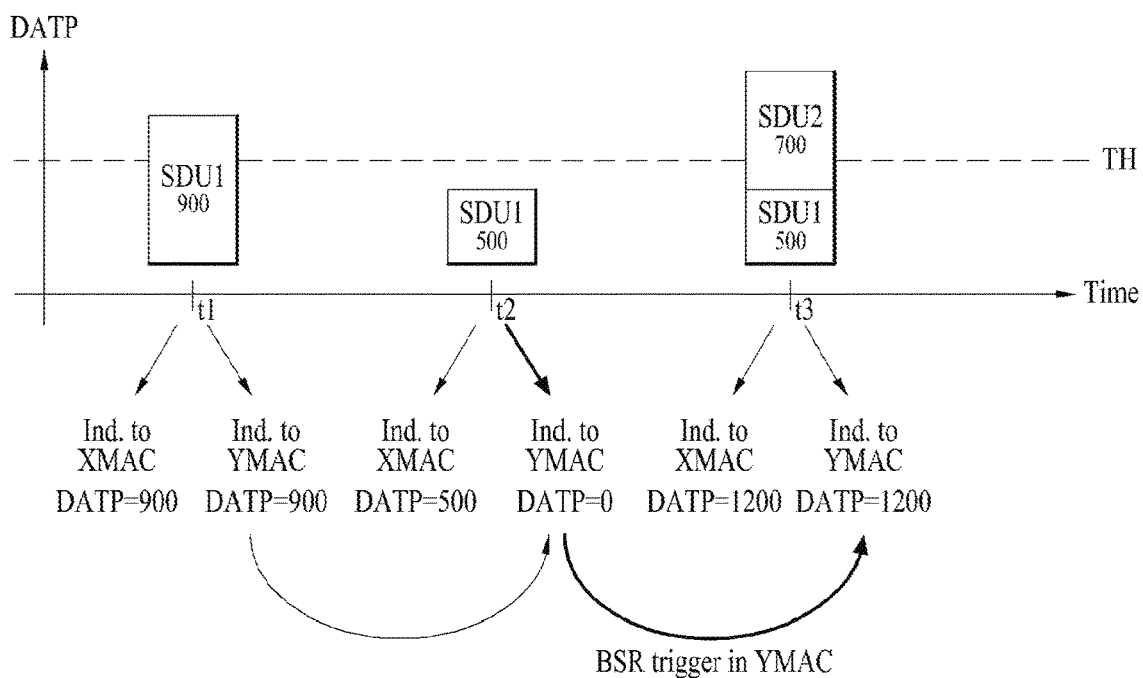
FIG. 14 is an example for triggering a buffer status reporting in dual connectivity according to embodiments of the present invention.

FIG. 14 is an example for triggering a buffer status reporting according to embodiments of the present invention.

Let assume that a threshold (TH) is set to 700 bytes.

At t=t1, the PDCP entity receives SDU1 with 900 bytes from the upper layer. The PDCP entity indicates 900 bytes to both X-MAC and Y-MAC entities, and both X-MAC and Y-MAC triggers BSRs because the buffer size changes from 0 to 900.

At t=t2, the XeNB and/or YeNB provides UL grants, and the UE transmits the part of PDCP SDU1 to the XeNB and/or YeNB. The DATP becomes 500 which is less than TH, and the PDCP entity indicates 500 to the X-MAC entity. At the same time, the PDCP entity indicates 0 to the Y-MAC entity.

At t=t3, the PDCP entity receives SDU2 with 700 bytes from the upper layer. The PDCP entity indicates DATP=1200 bytes to both X-MAC and Y-MAC entities. In this case, the Y-MAC entity triggers a BSR because the Y-MAC entity considers that the buffer size is changed from 0 to 1200.

A text proposal is provided below according to embodiments of the present invention.

For split bearers, when indicating the data available for transmission to the MAC entity for BSR triggering and Buffer Size calculation, the UE shall:
if ul-Data SplitThreshold is configured and the data available for transmission is larger than or equal to ul-Data SplitThreshold:
indicate the data available for transmission to both the MAC entity configured for SCG and the MAC entity configured for MCG;
else:
if ul-DataSplitDRB-ViaSCG is set to TRUE by upper layer:
indicate the data available for transmission to the MAC entity configured for SCG only;
if ul-Data SplitThreshold is configured, indicate the data available for transmission as 0 to the MAC entity configured for MCG;
else:
indicate the data available for transmission to the MAC entity configured for MCG only;
if ul-DataSplitThreshold is configured, indicate the data available for transmission as 0 to the MAC entity configured for SCG.

The dual connectivity enhancement introduces the threshold for the uplink split bearer, whereby this threshold is used by UE to evaluate whether the data amount for transmission is large or small. If the data amount is larger than the configured threshold, the UE sends BSR to both MCG and SCG, i.e., the UE has the opportunity to transmit the data towards both CGs depending on reception of UL grants. Otherwise, the UE only sends BSR to the configured CG, thus it may transmit the data only toward a CG (either MCG or SCG). This mechanism for BSR trigger and data transmission should also be considered for enhanced LTE-WLAN Aggregation (eLWA).

For eLWA, it was agreed that "LTE buffer status information will not be reported over the WLAN link". So, the double BSR like dual connectivity is no longer necessary. However, it is still worthwhile to retain a portion of the dual connectivity concept, such that a threshold could be used to limit unnecessary BSR towards LTE, e.g., when the direction is configured with WLAN and the data amount is smaller than the threshold, the UE does not need to send BSR towards LTE. In addition, it should also be possible to avoid unnecessary UE power consumption, e.g., when the direction is configured with LTE, the UE may not send the data towards WLAN as long as the data amount is smaller than the threshold.

Thus, the direction, which the UE sends uplink data when the data amount is smaller than the threshold, should be controllable by the network (NW). This is achievable e.g. by introducing ul-DataSplitDRB-ViaWLAN as dual connectivity.

According to the mentioned above, when the data amount becomes smaller than the threshold and the transmission direction is configured to be sent to LTE, the UE shall indicate the amount of data as 0 to one of the LTE-WLAN Aggregation Adaptation Protocol (LWAAP) MAC entities which is not configured to be sent.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the scope of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a user equipment (UE) for operating in a wireless communication system, the UE including a packet data convergence protocol (PDCP) entity and two medium access control (MAC) entities associated with the PDCP entity, the method comprising:
   receiving a radio resource control (RRC) message including a threshold from a base station;
   receiving, by a first MAC entity, a PDCP data volume from the PDCP entity;
   receiving, by a second MAC entity, the PDCP data volume from the PDCP entity;
   determining, by the first MAC entity and the second MAC entity, whether to trigger a buffer status reporting (BSR) based on the received PDCP data volume; and
   triggering, by at least one of the first MAC entity or the second MAC entity, the BSR,
   wherein based on a total data volume including an amount of data available for transmission in the PDCP entity being smaller than the threshold, the received PDCP data volume corresponding to either the first MAC entity or the second MAC entity is zero,
   wherein based on the total amount of data volume being equal to or larger the threshold, the received PDCP data volume corresponding to both the first MAC entity and the second MAC entity is the amount of data available for transmission in the PDCP entity.

2. The method according to claim 1, wherein the threshold is a threshold for splitting uplink data of a bearer.

3. The method according to claim 1, wherein based on the total data volume including the amount of data available for transmission in the PDCP entity being smaller than the threshold, a MAC entity other than a MAC entity that received the PDCP data volume set to 0 receives the PDCP data volume corresponding to the amount of data available for transmission in the PDCP entity.

4. The method according to claim 3, wherein either the first MAC entity or the second MAC entity regards there is no data available for transmission in PDCP layer based on the received PDCP data volume being '0'.

5. The method according to claim 4, wherein based on the total amount of data being changed from '0', the BSR is triggered.

6. The method according to claim 1, wherein the first MAC entity and the second MAC entity are configured for an uplink split bearer in dual connectivity.

7. A user equipment (UE) operating in a wireless communication system, the UE comprising:
   a radio frequency (RF) module including a transceiver; and
   a processor operably coupled with the RF module, the processor having a packet data convergence protocol (PDCP) entity and two Medium Access Control (MAC) entities associated to the PDCP entity, and the processor configured to:
   receive a radio resource control (RRC) message including a threshold from a base station;
   receive, by a first MAC entity, a PDCP data volume from the PDCP entity;
   receive, by a second MAC entity, the PDCP data volume from the PDCP entity;
   determine, by the first MAC entity and the second MAC entity, whether to trigger a buffer status reporting (BSR) based on the received PDCP data volume; and
   trigger, by at least one of the first MAC entity or the second MAC entity, the BSR,
   wherein based on a total data volume including an amount of data available for transmission in the PDCP entity being smaller than the threshold, the received PDCP data volume corresponding to either the first MAC entity or the second MAC entity is zero,
   wherein based on the total amount of data volume being equal to or larger the threshold, the received PDCP data volume corresponding to both the first MAC entity and the second MAC entity is the amount of data available for transmission in the PDCP entity.

8. The UE of claim 7, wherein the threshold is a threshold for splitting uplink data of a bearer.

9. The UE of claim 7, wherein based on the total data volume including the amount of data available for transmission in the PDCP entity being smaller than the threshold, a MAC entity other than a MAC entity that received the PDCP data volume set to 0 receives the PDCP data volume corresponding to the amount of data available for transmission in the PDCP entity.

10. The UE of claim 9, wherein either the first MAC entity or the second MAC entity regards there is no data available for transmission in PDCP layer based on the received PDCP data volume being '0'.

11. The UE of claim 10, wherein based on the total amount of data being changed from '0', the BSR is triggered.

12. The UE of claim 7, wherein the first MAC entity and the second MAC entity are configured for an uplink split bearer in dual connectivity.

* * * * *